US009287941B2

(12) United States Patent
Pajona et al.

(10) Patent No.: US 9,287,941 B2
(45) Date of Patent: Mar. 15, 2016

(54) BEAM FORMING AND STEERING USING LTE DIVERSITY ANTENNA

(71) Applicants: Olivier Pajona, Nice (FR); Sebastian Rowson, San Diego, CA (US); Laurent Desclos, San Diego, CA (US)

(72) Inventors: Olivier Pajona, Nice (FR); Sebastian Rowson, San Diego, CA (US); Laurent Desclos, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 0 days.

(21) Appl. No.: 14/451,700

(22) Filed: Aug. 5, 2014

(65) Prior Publication Data

US 2015/0036726 A1  Feb. 5, 2015

Related U.S. Application Data

(60) Provisional application No. 61/862,085, filed on Aug. 5, 2013.

(51) Int. Cl.
*H04B 1/38* (2015.01)
*H04B 7/04* (2006.01)
*H04L 29/06* (2006.01)
*H04B 7/06* (2006.01)

(52) U.S. Cl.
CPC .............. *H04B 7/0404* (2013.01); *H04B 7/043* (2013.01); *H04B 7/0617* (2013.01); *H04L 69/18* (2013.01)

(58) Field of Classification Search
CPC .... H04B 7/0404; H04B 7/061; H04B 7/0617; H04B 7/043; H04L 69/18

USPC ........ 375/219, 141, 220, 260, 267, 285, 295, 375/316; 370/252, 329, 330, 331, 278, 535; 455/39, 67.11, 63.4, 67.14, 434, 83, 455/500

See application file for complete search history.

(56) References Cited

U.S. PATENT DOCUMENTS

| 8,462,063 | B2* | 6/2013 | Gummalla et al. ............ 343/745 |
| 2011/0150050 | A1* | 6/2011 | Trigui et al. .................. 375/219 |
| 2011/0223925 | A1* | 9/2011 | Gale et al. ..................... 455/450 |
| 2013/0162476 | A1* | 6/2013 | Thomas et al. ............... 342/372 |
| 2014/0334564 | A1* | 11/2014 | Singh et al. ................... 375/267 |
| 2015/0036656 | A1* | 2/2015 | McCarthy et al. ............ 370/331 |

* cited by examiner

*Primary Examiner* — Dhaval Patel
(74) *Attorney, Agent, or Firm* — Coastal Patent Law Group, P.C.

(57) ABSTRACT

An antenna system, which is coupled to one or more first transceivers for processing signals according to one or more protocols, respectively, and to a second transceiver for performing a function in conjunction with at least one of the one or more protocols, is provided. The antenna system includes a first antenna, a second antenna, a circuit coupled to the first and second antennas, and a controller configured to control the circuit for enabling beam forming and beam steering or for enabling the function in conjunction with the at least one of the one or more protocols. The circuit includes a phase shifting block configured to provide multiple phase shifts between a first radiation pattern associated with the first antenna and a second radiation pattern associated with the second antenna to generate multiple combined radiation patterns corresponding to the phase shifts, respectively, for the beam forming and beam steering purposes.

6 Claims, 5 Drawing Sheets

BEAM FORMING AND STEERING USING LTE DIVERSITY ANTENNA

CROSS-REFERENCE TO RELATED APPLICATIONS

This application claims benefit of priority with U.S. Provisional Ser. No. 61/862,085, filed Aug. 5, 2013; the contents of which are hereby incorporated by reference.

BACKGROUND OF THE INVENTION

Mobile devices such as laptops, tablets, personal digital assistants, cellular phones, smart phones, MP3 players, video gaming devices, navigation devices, etc. may be provided with a wide variety of wireless services. Examples of these services include but not limited to: Global System for Mobile Communications (GSM), Radio Frequency Identification (RFID), Distributed Control System (DCS), Personal Communications Service (PCS), Ultra Wide Band (UWB), Digital Video Broadcasting-Terrestrial/Handheld (DVB-T/H), Wireless Fidelity (WiFi), Blue Tooth (BT), World Interoperability for Microwave Access (WiMax), Long Term Evolution (LTE), Global Positioning System (GPS), etc. Correspondingly, the number of antennas in each device needs to be increased as the number of wireless services increases, thereby requiring antennas with small sizes and high performances. In particular, the antennas used for cellular communication are generally required to have high efficiency, signal quality, gain and other performance metrics as the operators dimension networks with respect to base stations according to those metrics; thus, there is a possibility that devices with low performances get excluded from even a minimal service depending on the dimensioned network.

One way to improve the quality of the link between the mobile device and the base station is to use an array of antennas on the mobile device so as to combine different beams to increase the signal strength in the direction of the base station. Such a technique, referred to as "beam forming," is well known in theory to those skilled in the art. However, actual implementations for mobile devices or small systems have been difficult for the following two main reasons.

The first reason is that the space available for antennas in a mobile device or a small system is limited, as mentioned earlier. Even with the advancement of antenna technologies that achieve certain size reductions, the antenna dimensions are fundamentally related to the quarter wavelength of the frequency they are designed for. For example, in cellular low frequency bands (<1 GHz), such as GSM900 or GSM850, the quarter wavelength is about 9 cm in free space. Thus, putting even one antenna designed for cellular low frequency bands in a mobile device is already difficult due to the extremely small form factor, such as size and shape, of modern mobile devices. Needless to say, putting two or more low band antennas in a mobile device is a formidable undertaking without sacrificing some of the form factors.

The second reason is that the overall antenna system (including an array of antennas) should be able not only to perform beam forming but also to dynamically steer the direction of the high gain, or the peak of the beam, in the direction toward the base station as the relative position of the mobile device with respect to the base station changes. This technique, referred to as "beam steering," requires an active circuitry to control phase shifts among radiation patterns of different antennas in the array, as well as a specific algorithm or program on the mobile device to control the circuitry, thereby leading to more complexities and real estate.

DETAILED DESCRIPTION

It has been difficult to implement beam forming and beam steering techniques in 2G and 3G mobile devices mainly for the aforementioned reasons. The 4G (LTE) protocol, also referred to as LTE protocol, is different from the previous generations of protocols in a wide variety of aspects, but one important aspect is that LTE requires at least two antennas. In a typical 4G (LTE) system, one antenna is a main antenna that is used to support the 4G (LTE) protocol and other (2G and/or 3G) protocols, whereas the other antenna is a an antenna that is used to support diversity or Multiple Input Multiple Output (MIMO) mode for the 4G (LTE) protocol, when the LTE rank indicator indicates that diversity or MIMO mode is supported. Some of the 4G (LTE) frequency bands are located in the range of 700MHz-1 GHz (low bands) close to or overlapping with some of the 2G and/or 3G low bands. Other 4G (LTE) bands are located close to or overlapping with some of the 2G and/or 3G high bands. In a typical 2G and/or 3G system, beam forming and beam steering techniques will require at least one more antenna additional to the original antenna, and thus requiring additional space and circuit complexities. However, a 4G (LTE) system already has at least two antennas, one of which is dedicated to the originally intended function, i.e., diversity.

In view of the aforementioned problems related to implementation of beam forming and beam steering, this document discloses an antenna system including at least two antennas and capable of beam forming and beam steering for a mobile device supporting one or more protocols, at the minimal sacrifice of space availability.

Figure 1:
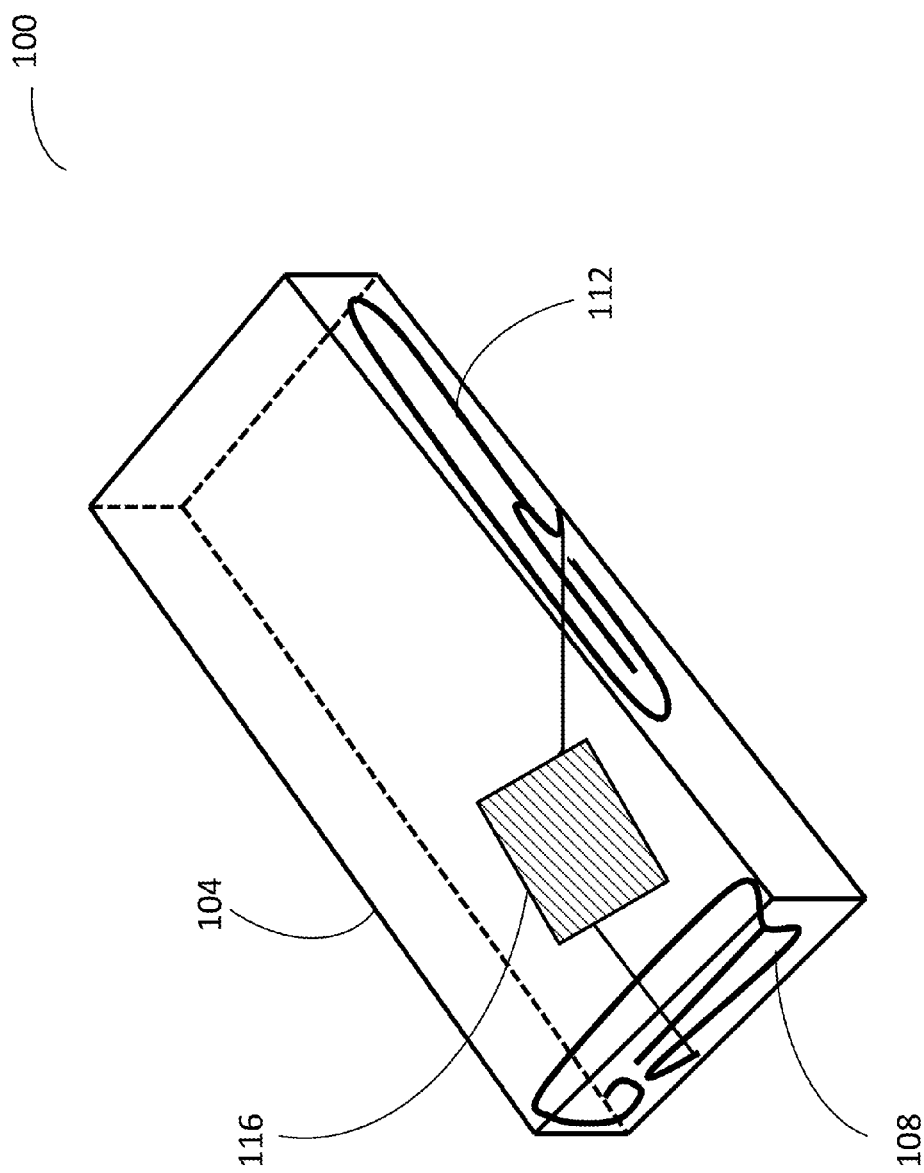
FIG. 1 illustrates an example of a mobile device supporting multiple protocols and having beam forming and beam steering capabilities.

FIG. 1 illustrates an example of a mobile device 100 supporting one or more protocols and having beam forming and beam steering capabilities. The housing 104, such as a cellular phone case, accommodates two antennas 108 and 112. One of the antennas 108 may be used as a main antenna, while the other antenna 112 may be used as a diversity antenna. This example includes a circuit 116 coupling the antennas 108 and 112, wherein the circuit 116 is configured to enable beam forming and steering as well as the diversity function. The shape and dimensions of each antenna can be varied depending on the performance requirements and space constraints. Specifically, the mobile device 100 can be configured to support 2G, 3G and 4G (LTE) protocols; however, any device supporting one or more protocols with multiple antennas may be configured to include a circuit such as the circuit 116 that enables not only the originally intended functions but also beam forming and beam steering. The originally intended function may not be limited to diversity. For example, a car-antenna system, which generally includes multiple antennas to support multiple protocols, may be adapted to perform beam forming and beam steering by incorporating a circuit similar to the circuit 116. Details of the circuit 116 are described below.

Figure 2:
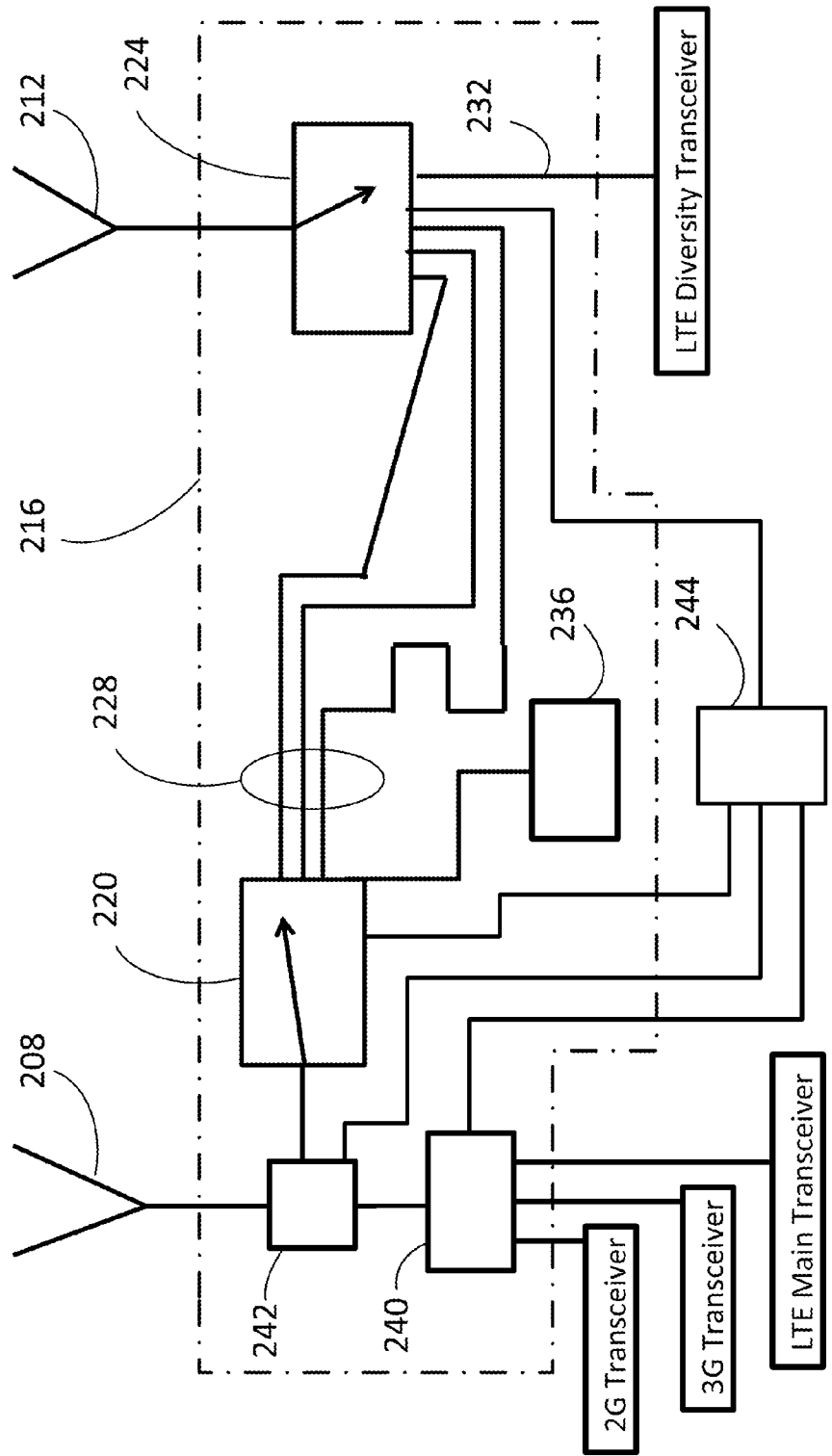
FIG. 2 illustrates an example of a communication system having an antenna system including two antennas and a circuit for enabling beam forming and beam steering as well as diversity.

FIG. 2 illustrates an example of a communication system having an antenna system including two antennas and a circuit for enabling beam forming and beam steering as well as the originally intended function, i.e., diversity in this case. This specific example illustrates a configuration in which the 2G, 3G and 4G (LTE) protocols are supported by having a first antenna 208 that is used as a main antenna, and a second antenna that is originally configured to be a diversity or MIMO antenna for the 4G (LTE) protocol. A circuit block 216 illustrates an example of the circuit, such as the circuit 116 of FIG. 1, which is configured to enable beam forming and beam steering as well as the diversity function. The 2G, 3G and 4G (LTE) transceivers are associated with the main antenna 208 for processing signals according to these protocols. These transceivers may be integrated on one chip; the 2G and 3G transceivers may be integrated on one chip and the 4G (LTE) transceiver may be integrated on another; or any integration may be carried out depending on performance, cost and space requirements. The 4G (LTE) diversity transceiver is associated with the diversity antenna 212 for performing the diversity function in conjunction with the 4G (LTE) protocol.

The circuit block 216 in the example of FIG. 2 includes a first switch 220 and a second switch 224. These two switches 220 and 224 are coupled to each other via multiple transmission lines 228. The first switch 220 is a single pole multiple throw switch to connect the main antenna 208 to one of the transmission lines 228. The second switch 224 is another single pole multiple throw switch to connect the diversity antenna 212 to either one of the transmission lines 228 or to a transmission line 232 that is coupled to the 4G (LTE) diversity transceiver. One of the terminals of the first switch 220 may be configured to be open, grounded, or shorted to a component or module in the system, as represented by a block 236. The circuit block 216 may be configured to further include a module 240 coupled to the main antenna 208 for selecting one or more of the main 2G, 3G or 4G (LTE) transceivers according to the selected protocol and selected communication configuration (SISO, MIMO or diversity) during each time period. The module 240 may be coupled to a power combiner/splitter 242, which is configured to select between the path with the first switch 220 and the path with the module 240. A controller 244, in this case, is coupled at least to the first switch 220, the second switch 224, the module 240 and the power combiner/splitter 242 so as to control the selection of paths.

When the main antenna 208 is needed for the 2G and/or 3G communication, or for 4G communication when the MIMO or diversity mode cannot be supported at this instant, the controller 244 controls the first switch 220 and the second switch 224 to turn off. Alternatively, the switch 220 may connect the path to the block 236, while the second switch is turned off. The controller 244 further controls the module 240 to couple the main antenna 208 to the 2G and/or 3G transceiver and/or 4G receiver.

When the diversity antenna 212 is needed for the originally intended function, i.e., diversity or MIMO for the 4G (LTE) communication in this case, the controller 244 controls the second switch 224 to connect the diversity antenna 212 to the transmission line 232 that is coupled to the 4G (LTE) diversity transceiver. The controller 244 further controls the module 240 to couple the main antenna 208 to the 4G (LTE) main transceiver for the 4G (LTE) communication. The controller 244 further controls the first switch 220 to connect the path to the block 236, where the line associated with the main antenna 208 gets open, grounded or shorted to a component or module in the system, so as to decouple the main antenna 208 from the transmission lines 228. Alternatively, the controller 244 may control the first switch 220 to turn off.

The mechanism for beam forming and beam steering in this example can be explained as follows. The transmission lines 228 in the example of FIG. 2 may be configured to be delay lines. A delay line generally introduces a time delay of a signal by an amount depending on the electrical length of the line. Accordingly, by configuring the electrical lengths of the delay lines so as to correspond to desired time delays, or equivalently phase shifts, between two signals, the combined signal associated with each delay line can be generated to have a wave form that is desired for the specific time period. Therefore, with a priori knowledge regarding the two radiation patterns transmitted from or received by the two antennas 208 and 212, respectively, the phase shifts between the two radiations patterns can be predetermined so that a combination of the radiation patterns corresponding to each phase shift can be generated to optimize the gain and signal quality in a target direction during each time period. The controller 244 can be configured to control the first switch 220 and the second switch 224 to couple the two antennas by connecting the paths to the specific delay line corresponding to the specific phase shift. Beam forming and beam steering can be thus realized by using the antenna system having the multiple delay lines coupling the main antenna 208 and the diversity antenna 212, as illustrated in the example of FIG. 2.

Figure 3:
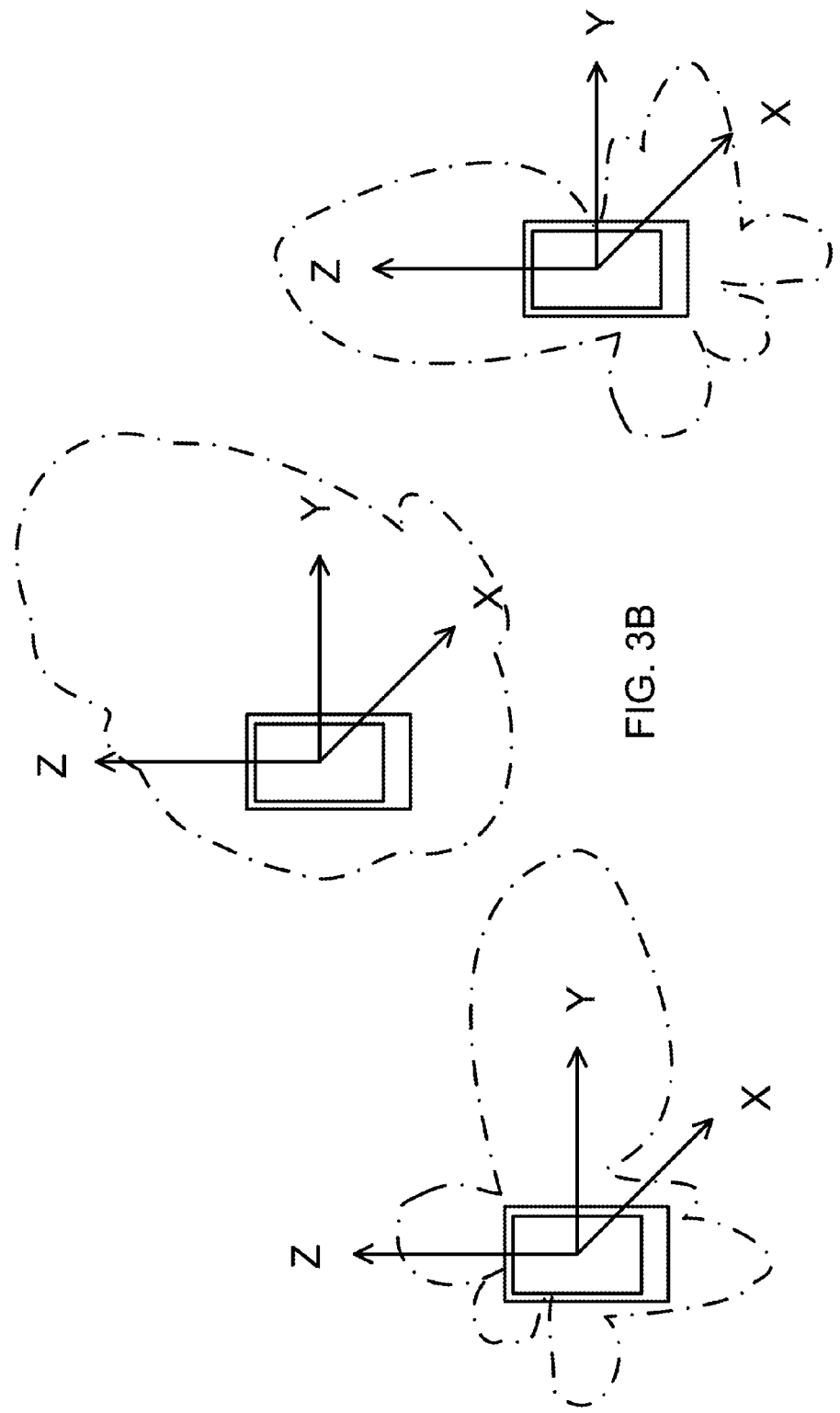
FIGS. 3A-3C illustrate examples of three different radiation patterns corresponding to three different phase shifts.

FIGS. 3A-3C illustrate examples of three different radiation patterns corresponding to three different phase shifts. In this example, the mobile device is configured to include a first antenna that generates a first radiation pattern having the highest gain in the Y direction, and a second antenna that generates a second radiation pattern having the highest gain in the Z direction. FIG. 3A illustrates a first mode in which the time delay, or the phase shift, is set so that the contribution from the second radiation pattern is almost negligible, resulting in a combined radiation pattern having the highest gain in the Y direction. FIG. 3B illustrates a second mode in which the time delay, or the phase shift, is set so that the first and second radiation patterns coexist in phase, resulting in a combined radiation pattern having the highest gain in the Y+Z direction. FIG. 3C illustrates a third mode in which the time delay, or the phase shift, is set so that the contribution form the first radiation pattern is almost negligible, resulting in a combined radiation pattern having the highest gain in the Z direction.

Figure 4:
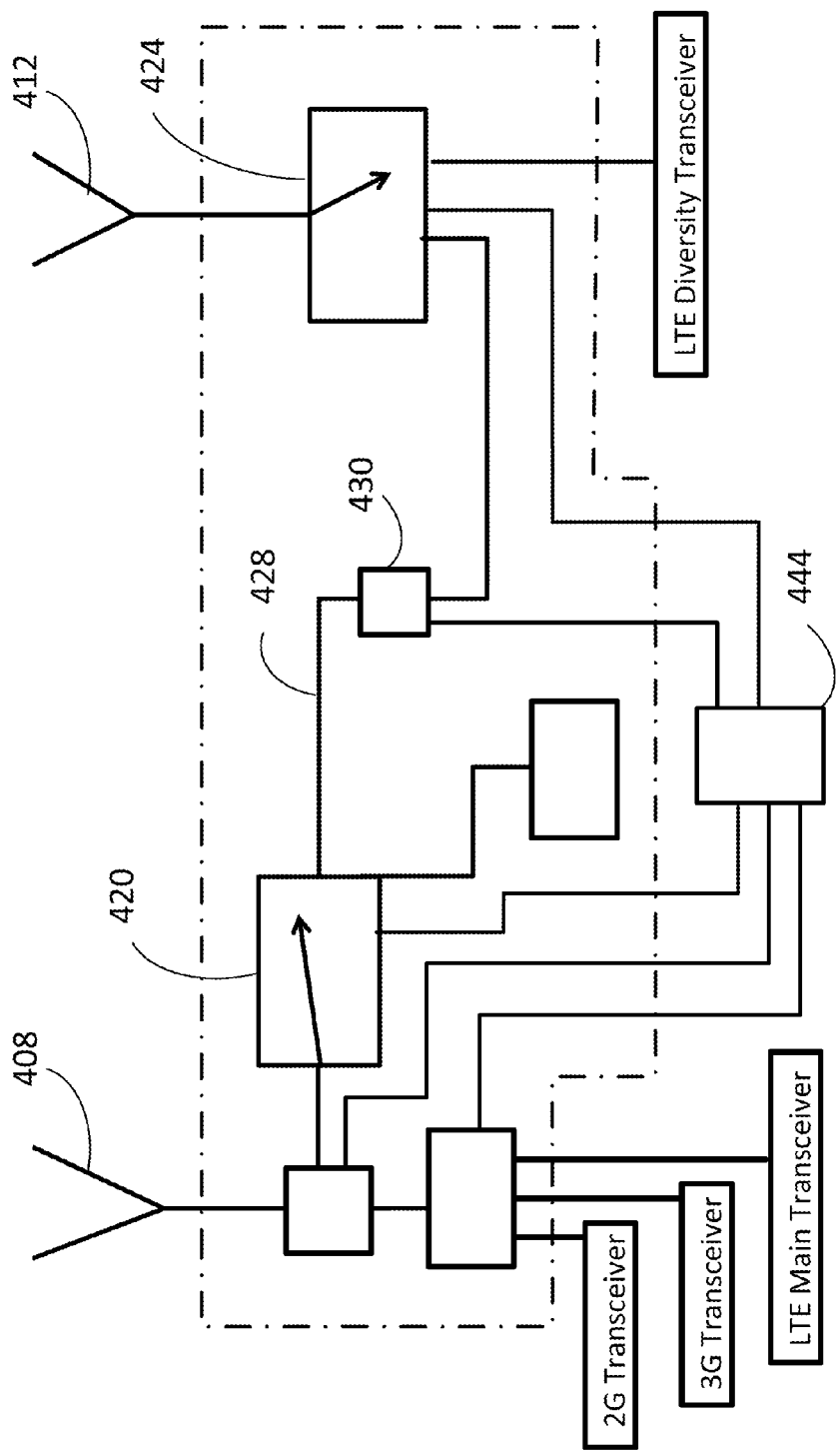
FIG. 4 illustrates another example of a communication system having an antenna system including two antennas and a circuit for enabling beam forming and beam steering as well as diversity.

FIG. 4 illustrates another example of a communication system having an antenna system including two antennas and a circuit for enabling beam forming and beam steering as well as the originally intended function, i.e., diversity in this case. The configuration of this system and functions performed by each component, module and block are similar to those in the example illustrated in FIG. 2, except that the multiple transmission lines 228 are now replaced by a single transmission line 428 and a phase shifter 430. In the example of FIG. 2, the transmission lines 228 are configured to be delay lines having different electrical lengths to provide desired time delays, or phase shifts, between the two signals associated with the two antennas. In the example of FIG. 4, when beam forming and beam steering are necessary, each of the switches 420 and 424 is controlled by the controller 444 to connect the path to the transmission line 428 so as to couple the two antennas 408 and 412. Additionally, the phase shifter 430 is controlled by the controller 444 to provide a specific phase shift to generate a combined radiation pattern with the highest gain in a specific direction. The number of phase shifts provided by the phase shifter 430 is the same as the number of different modes, i.e., different radiation patterns, which the antenna system is required to generate for the beam forming and beam steering purposes.

In the above examples illustrated in FIGS. 2 and 4, the communication system supports 2G, 3G and 4G (LTE) protocols, having a first antenna that is used as a main antenna, and a second antenna that is originally intended to be used as a diversity antenna. The 2G, 3G and 4G (LTE) transceivers are associated with the main antenna for processing signals according to these protocols. The 4G (LTE) diversity transceiver is associated with the diversity antenna for performing the diversity function in conjunction with the 4G (LTE) protocol. Beam forming and beam steering are enabled by incorporating a circuit block that couples the first and second antenna for generating combined radiation patterns corresponding to different phase shifts. The circuit block in the example of FIG. 2 includes multiple delay lines, and the circuit block in the example of FIG. 4 includes a transmission line with a phase shifter. However, the present beam forming and beam steering scheme can be adapted for use in different communication systems supporting one or more protocols and having at least two antennas, one of which is designed to perform an originally intended function, e.g., diversity or any other function.

Figure 5:
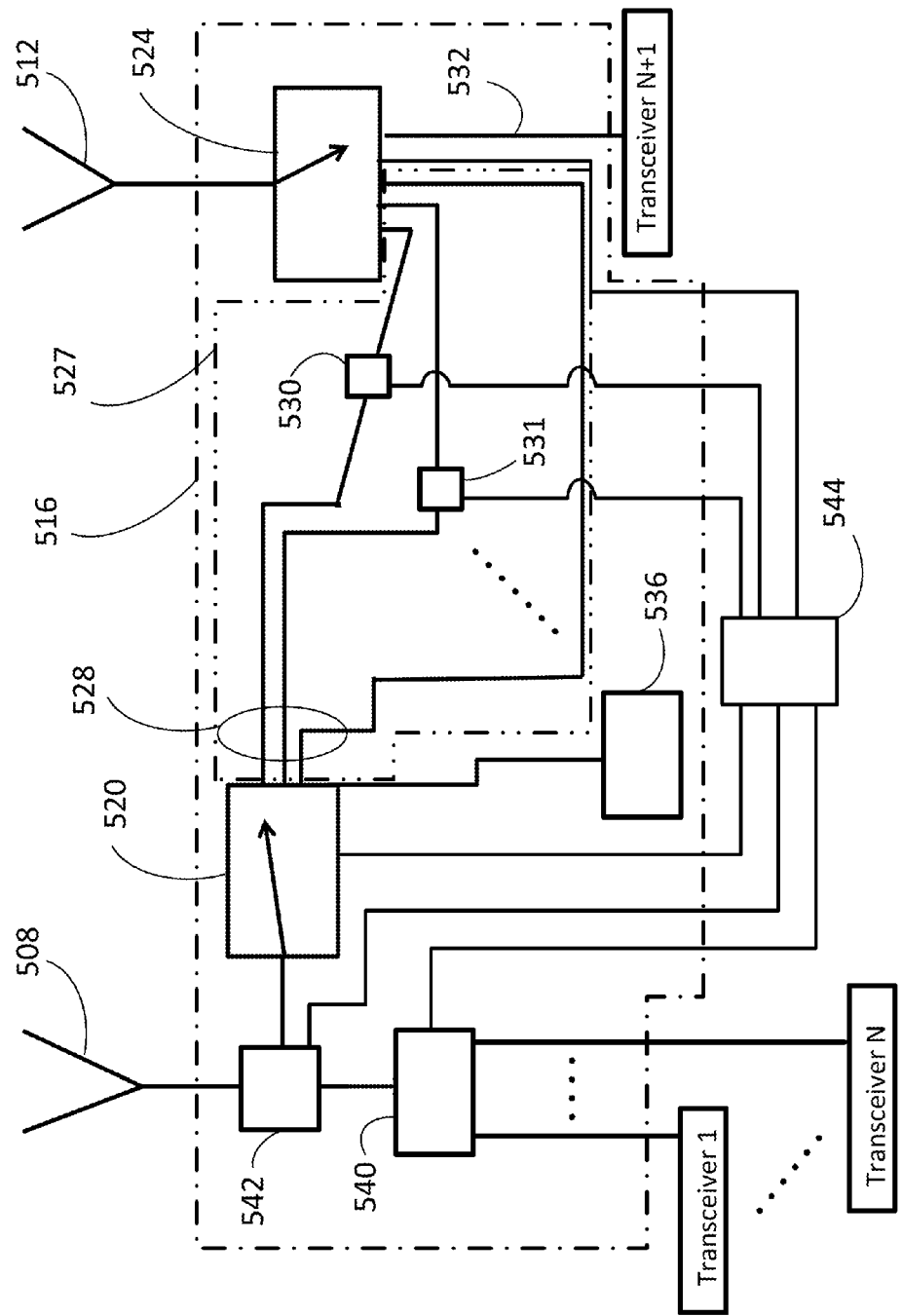
FIG. 5 illustrates yet another example of a communication system having an antenna system including two antennas and a circuit for enabling beam forming and beam steering as well as an originally intended function.

FIG. 5 illustrates yet another example of a communication system having an antenna system including two antennas and a circuit for enabling beam forming and beam steering as well as an originally intended function. This example illustrates a case in which a first through $N^{th}$ protocols are supported by having a first antenna 508 that is used as a main antenna and a second antenna that is configured to perform the originally intended function. A circuit block 516 is configured to enable beam forming and beam steering as well as the originally intended function. A first through $N^{th}$ transceivers are associated with the main antenna 508 for processing signals according to the first-$N^{th}$ protocols. An $(N+1)^{th}$ transceiver is associated with the second antenna 512 for performing the originally intended function in conjunction with at least one of the first-$N^{th}$ protocols.

The circuit block 516 in the example of FIG. 5 includes a first switch 520 and a second switch 524. The first switch 520 is coupled the first antenna 508, and the second switch 524 is coupled to the second antenna 512. These two switches 520 and 524 are coupled to each other via a phase shifting block 527. The phase shifting block 527 is configured to provide multiple phase shifts between two radiation patterns associated with the two antennas 508 and 512. The phase shifting block 527 may include one or more transmission lines 528. At least one of the one or more transmission lines 528 may have a phase shifter, such as indicated by 530 or 531, and the other transmission lines 528 may be configured to be delay lines. Alternatively, all of the one or more transmission lines 528 may be configured to be delay lines. Yet alternatively, each of the one or more transmission lines 528 may have a phase shifter. The first switch 520 is configured to connect the main antenna 508 to one of the one or more transmission lines 528. The second switch 524 is configured to connect the second antenna 512 to either one of the one or more transmission lines 528 or to a transmission line 532 that is coupled to the $(N+1)^{th}$ transceiver. One of the terminals of the first witch 520 may be configured to be open, grounded, or shorted to a component or module in the system, as represented by a block 536. The circuit block 516 may be configured to further include a module 540 coupled to the main antenna 508 for selecting one or more of the first-$N^{th}$ transceiver according to the one or more protocols selected during each time period. The module 540 may be coupled to a power combiner/splitter 542, which is configured to select between the path with the first switch 520 and the path with the module 540. A controller 544, in this case, is coupled at least to the first switch 520, the second switch 524, the module 540 and the power combiner/splitter 542 so as to control the selection of paths. In the present example, the controller 544 is further coupled to the phase shifters 530 and 531 so as to control the selection of phase shifts. The total number of phase shifts provided by the phase shifting block 527 is configured to be the same as the number of modes, i.e., radiation patterns, required to be generated for the beam forming and beam steering purposes.

When the first antenna 508 is needed for one or more of the first-$N^{th}$ protocols, the controller 544 controls the first switch 520 and the second switch 524 to turn off. Alternatively, the switch 520 may connect the path to the block 536, while the second switch 524 is turned off. The controller 544 further controls the module 540 to couple the first antenna 508 to one or more of the first-$N^{th}$ transceivers corresponding to the one or more protocols.

When the second antenna 512 is needed for the originally intended function, for example, diversity, for at least one of the first-$N^{th}$ protocols, the controller 544 controls the switch 524 to connect the second antenna 512 to the transmission line 532 that is coupled to the $(N+1)^{th}$ transceiver for performing the originally intended function in conjunction with the at least one of the first-$N^{th}$ protocols. The controller 544 further controls the module 540 to couple the first antenna 508 to at least one of the first-$N^{th}$ transceivers corresponding to the at least one of the first-$N^{th}$ protocols. The controller 544 further controls the switch 520 to connect the path to the block 536, where the line associated with the first antenna 508 gets open, grounded or shorted to a component or module in the system, so as to decouple the first antenna 508 from the transmission lines 528. Alternatively, the controller 544 may control the switch 520 to turn off.

When beam forming and beam steering are necessary, each of the switches 520 and 524 is controlled by the controller 544 to connect the path to the phase shifting block 527 so as to couple the two antennas 508 and 512. The phase shifting block 527 is configured to provide multiple phase shifts between two radiation patterns associated with the two antennas 508 and 512. The phase shifting block 527 may include one or more transmission lines 528. At least one of the one or more transmission lines 528 may have a phase shifter, such as indicated by 530 or 531, and the other transmission lines 528 may be configured to be delay lines. Alternatively, all of the one or more transmission lines 528 may be configured to be delay lines. Yet alternatively, each of the one or more transmission lines 528 may have a phase shifter. The controller 544 controls the first switch 520, the second switch 524 and the phase shifting block 527 to couple the two antennas 508 and 512 and select a specific phase shift to generate a corresponding mode during a time period when the mode, i.e., the radiation pattern, is required for the beam forming and beam steering. The selection of a mode among multiple modes during each time period is controlled by the controller 544. For example, one of the delay lines without a phase shifter may be selected to generate the radiation pattern corresponding to the phase shift corresponding to the electrical length of the selected delay line. In another example, the transmission line having the phase shifter 530 may be selected, and the controller further controls the phase shifter 530 to have a specific phase shift to generate the radiation pattern corresponding to the selected phase shift.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed:

1. An antenna system coupled to one or more first transceivers for processing signals according to one or more protocols, respectively, and to a second transceiver for performing a function in conjunction with at least one of the one or more protocols, the antenna system comprising:
    a first antenna associated with the one or more first transceivers;
    a second antenna associated with the second transceiver;
    a circuit coupled to each of the first antenna and the second antenna; and
    a controller configured to control the circuit for enabling beam forming and beam steering or for enabling the function in conjunction with the at least one of the one or more protocols;
    further characterized in that the circuit comprises:
        a first switch coupled to the first antenna at a power combiner, splitter, or a combination thereof;
        a second switch coupled to the second antenna;
        at least one transmission line coupling the first switch and the second switch; and
        a transceiver selection module coupled to the power combiner, splitter, or combination thereof;
    wherein:
        each of the first switch, the second switch, the transceiver selection module, and the power combiner, splitter, or a combination thereof is adapted to be individually coupled to the controller.

2. The antenna system of claim 1, wherein
one terminal of the first switch is configured to be open, grounded, or shorted to a component or decoupling module in the system.

3. The antenna system of claim 1, wherein
a plurality of transmission lines extend between the first switch and second switch; and
said plurality of transmission lines forming a phase shifting block.

4. The antenna system of claim 1, wherein
a phase shifter is coupled to one of the at least one transmission line coupling the first switch and the second switch.

5. The antenna system of claim 4, wherein
the phase shifter is further coupled to the controller.

6. In a mobile device, an antenna system coupled to one or more first transceivers for processing signals according to one or more protocols, respectively, and to a second transceiver for performing a function in conjunction with at least one of the one or more protocols, the antenna system comprising:
    a first antenna associated with the one or more first transceivers;
    a second antenna associated with the second transceiver;
    a circuit coupled to the first antenna and the second antenna; and
    a controller configured to control the circuit for enabling beam forming and beam steering or for enabling the function in conjunction with the at least one of the one or more protocols;
    characterized in that the circuit further comprises:
        a first switch coupled to the first antenna at a power combiner, splitter, or a combination thereof;
        a second switch coupled to the second antenna;
        at least one transmission line coupling the first switch and the second switch; and
        a transceiver selection module coupled to the power combiner, splitter, or combination thereof;
    wherein:
        each of the first switch, the second switch, the transceiver selection module, and the power combiner, splitter, or a combination thereof is individually adapted for coupling with the controller.

* * * * *